May 28, 1963     A. G. STIMSON     3,091,162
ZOOM PHOTOMETRIC SYSTEM
Filed Aug. 6, 1962
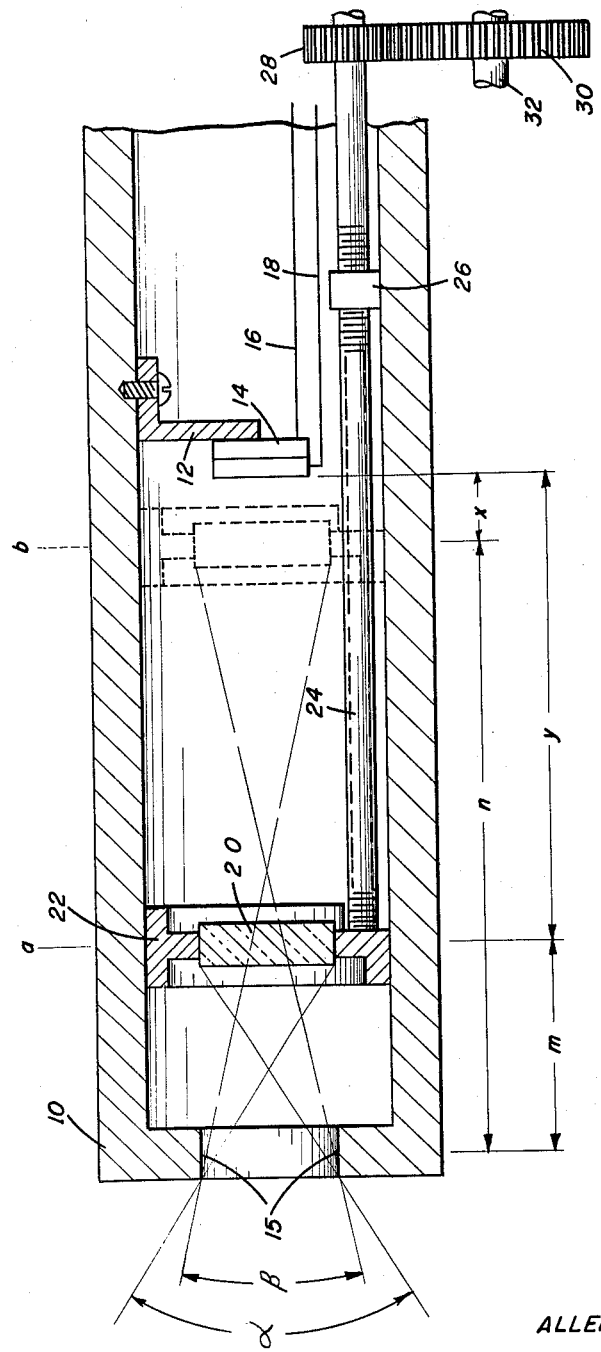
ALLEN G. STIMSON
INVENTOR.
BY *R. Frank Smith*
*Robert W. Hampton*
ATTORNEYS 3,091,162
ZOOM PHOTOMETRIC SYSTEM
Allen G. Stimson, Rochester, N.Y., assignor to Eastman Kodak Company, Rochester, N.Y., a corporation of New Jersey
Filed Aug. 6, 1962, Ser. No. 214,979
3 Claims. (Cl. 95—10)

The present invention relates to photographic cameras and more particularly concerns zoom cameras having photoelectric exposure control systems.

With the advent of cameras having zoom-type taking lenses and photoelectric exposure control systems, there developed a need for zoom control of the exposure meter so that the latter automatically would cover the same field as the taking lens. In the zoom system for the meter, it is not necessary to focus the scene image on the photocell, but is is necessary that the photocell response not change with the field angle of the cell, insofar as the field is uniformly bright.

In a simple zoom arrangement for the photocell, the cell is movably located behind its lens or aperture, such that, for example the photocell circuit is properly calibrated when the cell is located near its aperture where it will receive light from a field approximately equal to that of the taking lens at the wide angle setting of the latter. As the photocell is moved backward away from its aperture, its effective $f$-number becomes larger as the field angle diminishes. This change in $f$-number reduces the sensitivity of the photocell circuit, thereby changing the exposure indication to cause erroneous operation of the camera.

In order to correct this defect it is a principal object of the present invention to maintain illumination of a photocell substantially constant while the field angle of the photocell is changed.

Another object of the invention is to move a light-transmitting and diffusing member between a photocell and its aperture for adjusting the apparent field angle through which the photocell is illuminated.

Other objects of the invention will appear from the following description, reference being made to the accompanying drawing which illustrates a sectional side view of a portion of a camera embodying the invention.

Referring to the drawing, a tubular housing 10 on a photographic camera has a bracket 12 on its inner surface for mounting a photocell 14 and has an aperture 15 through which the photocell is illuminated by field light. The photocell 14 can be employed for indicating field brightness or for automatically or semi-automatically controlling camera exposure in any manner well known in the art, and for this purpose is connected to an electric measuring instrument, not shown, through a pair of electric leads 16 and 18.

A member 20, which transmits and diffuses light, is mounted in an opaque ring 22 which constitutes a light baffle member surrounding member 20. Ring 22 is mounted snugly within the tubular housing 10 for sliding back and forth in that housing and is adapted to threadably engage an elongated screw 24, which is supported by a bracket 26. Screw 24 is rotatable for moving ring 22 and member 20 back and forth within the housing 10, for example between positions indicated at "$a$" and "$b$." Screw 24 may be rotated by means of a gear 28 integral therewith and meshing with a gear 30 mounted on a shaft 32. The latter gear may be driven, for example, in unison with the adjustment of the zoom taking lens of a camera, as illustrated in U.S. Patent 2,995,061.

When the diffusing member 20 is illuminated by field light through aperture 15, its rear surface manifests a brightness which is directly proportional to the incident light. This brightness may be expressed as footlamberts of brightness on the emitting, or rear surface of the diffuser, per footcandle of light incident on the front, or illuminated surface of the diffuer. In the preferred embodiment, wherein ring 22 constitutes an opaque baffle member, the rear surface of the diffusing member is the only source of light to which the photocell is exposed. Accordingly, the solid angular field of light $\alpha$ or $\beta$ affecting the photocell is defined by the size of aperture 15, the size of diffuser 20 and the distance, e.g., "$m$" or "$n$," between the aperture and the diffuser. The illumination on cell 14 depends on the brightness of the rear surface of diffusing member 20 as well as the distance, e.g., "$x$" or "$y$," between the diffuser and the photocell. Within the limits of the inverse square law the illumination on the photocell is equal to the candlepower of the emitting surface of diffuser 20 divided by the square of the distance "$x$" to "$y$."

As the diffusing member is moved from position "$a$" to position "$b$" as indicated in the drawing, the incident illumination on the forward surface of the diffusing member is reduced, according to the inverse square law, by the factor $$\frac{m^2}{n^2}$$

However, the emitting surface of the diffusing member is now closer to the photocell and the illumination of the photocell per unit of diffuser emission is increased by a factor corresponding to $$\frac{y^2}{x^2}$$

Thus, the illumination of the photocell remains substantially constant while the field angle has been changed. Of course, the above analysis is based on the inverse square law, which applies specifically to point sources, but in the system illustrated in the drawing the errors arising from the use of light sources other than point sources are not great and are well within the accepted tolerances of exposure control systems for amateur photography.

Where:

B = field brightness (footlamberts);
A = diffuser emission per unit of illumination of diffuser (footlamberts per footcandle);
$F_a$ = illumination (footcandles) of diffuser at position $a$;
$F_b$ = illumination (footcandles) of diffuser at position $b$;
$G_a$ = illumination (footcandles) of photocell with diffuser at position $a$;
$G_b$ = illumination (footcandles) of photocell with diffuser at position $b$; and
$c$ and $k$ = constants.

The illumination of the front surface of the diffuser is related to the brightness of the field, as follows:

$$F_a = \frac{kB}{m^2} \tag{1}$$

$$F_b = \frac{kB}{n^2} \tag{2}$$

The illumination of the photocell is then:

$$G_a = \frac{cF_a A}{y^2} \tag{3}$$

$$G_b = \frac{cF_b A}{x^2} \tag{4}$$

If Equations 1 and 2 are substituted in Equations 3 and 4, respectively, $$G_a = \frac{B}{m^2}\frac{A}{y^2} \quad (5)$$

$$G_b = \frac{B}{n^2}\frac{A}{x^2} \quad (6)$$

The ratio of the illumination of the diffuser at position $a$ to its illumination at position $b$, is:

$$\frac{G_a}{G_b} = \frac{n^2 x^2}{m^2 y^2} \quad (7)$$

If, as required, the illumination of the photocell remains constant when the diffuser is moved from position $a$ to position $b$, then:

$$\frac{G_a}{G_b} = 1 \quad (8)$$

Equation 8 is satisfied if, for example, the photometric system is made symmetrical in the sense that:

$$n = py \quad (9)$$

$$m = px \quad (10)$$

Substituting Equations 9 and 10 in Equation 7:

$$\frac{G_a}{G_b} = \frac{p^2 y^2 x^2}{p^2 x^2 y^2} = 1 \quad (11)$$

The invention has been described in detail with particular reference to a preferred embodiment thereof, but it will be understood that variations and modifications can be effected within the spirit and scope of the invention as described hereinabove and as defined in the appended claims.

I claim:

1. In a camera having a photocell illuminatable by field light through an aperture, means for changing the effective field angle of the photocell while maintaining the illumination thereof substantially constant, said means comprising a light-transmitting and light-diffusing member mounted between said photocell and said aperture for receiving field light and for transmitting a portion thereof to said photocell, and means for moving said member back and forth between said aperture and said photocell.

2. The apparatus defined in claim 1, wherein said member is slidably mounted in a tubular housing in one end of which said aperture is formed, with opaque, light-baffle means surrounding said member in said housing and movable therewith.

3. The apparatus defined in claim 1, with means for moving said member in timed relation to the adjustment of a zoom taking lens in said camera.

References Cited in the file of this patent

UNITED STATES PATENTS

| | | |
|---|---|---|
| 2,700,916 | Muirhead | Feb. 1, 1955 |
| 3,000,280 | Faulhaber | Sept. 19, 1961 |
| 3,007,381 | Melle | Nov. 7, 1961 |